US006551503B2

(12) United States Patent
Niers et al.

(10) Patent No.: US 6,551,503 B2
(45) Date of Patent: Apr. 22, 2003

(54) FILTERING DEVICE WITH CYLINDRICAL FILTERING ELEMENT, IDENTIFICATION LABEL AND RECEIVER

(75) Inventors: Louis Antonius Hubertus Maria Niers, Hengelo (NL); Alexander Victor Eichelsheim, Oldenzaal (NL)

(73) Assignee: Fairey Arlon B.V. (NL)

( * ) Notice: Subject to any disclaimer, the term of this patent is extended or adjusted under 35 U.S.C. 154(b) by 0 days.

(21) Appl. No.: 09/886,338

(22) Filed: Jun. 21, 2001

(65) Prior Publication Data

US 2001/0042707 A1 Nov. 22, 2001

Related U.S. Application Data

(63) Continuation of application No. PCT/NL99/00823, filed on Dec. 30, 1999.

(30) Foreign Application Priority Data

Dec. 31, 1998 (NL) ............................................. 1010941

(51) Int. Cl.⁷ ............................................. B01D 35/143
(52) U.S. Cl. ............................. 210/85; 96/417; 96/423; 210/91; 210/443; 210/497.01
(58) Field of Search ............................. 210/85, 91, 94, 210/282, 440, 443, 444, 450, 451, 455, 497.01, 484; 96/417, 423

(56) References Cited

U.S. PATENT DOCUMENTS

| 5,192,424 A | * | 3/1993 | Beyne et al. | 210/91 |
| 5,674,381 A |   | 10/1997 | Den Dekker |  |
| 6,051,144 A | * | 4/2000 | Clack et al. | 210/91 |

* cited by examiner

*Primary Examiner*—Joseph W. Drodge
(74) *Attorney, Agent, or Firm*—Todd Deveau; Ryan A. Schneider; Troutman Sanders LLP

(57) ABSTRACT

A filtering device including a casing with an inlet space for liquid to be filtered and an outlet space for filtered liquid; a substantially cylindrical filtering element of the disposable type, which is removably placed within the casing to function therein as a liquid permeable partition between the inlet space and the outlet space; a unique information containing micro circuit or chip provided in the filtering element, adapted to function as an identification label and cooperating with a receiver provided in the casing, so as to provide for a periodical or continuous exchange of information between the micro circuit and the receiver. The micro circuit is embedded, at a circumferential location, in an annular seal provided at a terminal edge of the cylindrical filtering element, the seal enabling the filtering element to sealingly engage an annular seat between the inlet space and the outlet space. The receiver is provided in the seat and includes a flat annular coil, the average diameter of which corresponds with that of the annular seal.

20 Claims, 1 Drawing Sheet

FILTERING DEVICE WITH CYLINDRICAL FILTERING ELEMENT, IDENTIFICATION LABEL AND RECEIVER

CROSS REFERENCE TO RELATED APPLICATIONS AND CLAIM OF PRIORITY

This application is a continuation of PCT/NL99/00823, filed on Dec. 30, 1999, which claims priority to NL application 1010941, filed on Dec. 31, 1998.

FIELD OF THE INVENTION

This invention relates to filtering devices provided with a disposable filtering element. In such filtering devices the filtering element has to be replaced periodically so as to keep the filtering device functioning properly. A micro circuit or chip integrated in the filtering element may contain unique information about the type of filtering element, the time it was installed etc. and thus enables to check whether the correct (type of) filtering element has been placed and for how long it has been functioning.

DESCRIPTION OF THE PRIOR ART

U.S. Pat. No. 5,674,381 discloses an assembly of a filtering apparatus and a replaceable filtering element, with which an electronic identification label is included in the replaceable filtering element for cooperation with read out means included in the apparatus. The well-known filtering element is in the form of a bag and the identification label is placed in a central position in (or on) the bottom part of the filtering bag for exchanging information with the read out means that is placed in the axis of the filtering apparatus. For the well-known filtering device it is thus essential that the replaceable filtering element comprises a bottom portion which carries the identification label in a central position.

In various types of filtering devices, however, open ended cylindrical filtering elements are used, with which it would not be possible to apply the electronic identification system in the way disclosed in the US patent mentioned hereinabove.

SUMMARY OF THE INVENTION

Accordingly the present invention aims at providing a filtering device of the type in which use is made of a disposable open ended cylindrical filtering element and with which electronic means on the permanent part of the filtering device and on the displosable filtering element respectively work together to enable to check whether the correct type of filtering element is placed, when it was placed, whether or when it should be replaced etc.

According to the invention this aim is achieved by providing a filtering device, more particularly a fluid filter, comprising a casing with an inlet space for liquid to be filtered and an outlet space for filtered liquid;

a substantially cylindrical filtering element of the disposable type, which is removably placed within the casing to function therein as a liquid permeable partition between the inlet space and the outlet space;

a unique information containing micro circuit provided in said filtering element, adapted to function as an identification label and to that end cooperating with a receiver means provided in the casing, so as to provide for a periodical or continuous exchange of information between the micro circuit and the receiver means;

wherein said micro circuit is embedded, at a circumferential location, in an annular sealing means that is applied to the terminal edge of an open end of the cylindrical filtering element to provide sealing engagement between the filtering element and a corresponding seat between said inlet space and said outlet space and wherein said receiver means is provided in said seat and comprises a flat annular coil, the average diameter of which corresponds with that of said annular sealing means.

Thus unlike the filtering element in the well-known filtering device the filtering element in the filtering device of the present invention has its identification label at a location that is eccentrical to the axis of the filtering element. In spite of the latter the filtering element of the present invention may be simply put in place, i.e. without paying attention to the angular position of the label, because the annular form of the receiver means guarantees that the micro circuit will always get in an operative position relative to the receiver means.

As the micro circuit is making part of the filtering element and will thus be disposed together with the filter element after use, it is important that the circuit is designed as simple and cheap as possible. To this end a micro circuit of the "passive" type is to be preferred, which may, in the manner of a transponder, cooperate with the receiving element within the casing of the filter.

However, a micro circuit of the "active" type, i.e. equipped with an independent power source, may also be advantageous. The end of the life of the power source may e.g. be an indication for the time, during which the filter element has been in use. Furthermore an active micro circuit could perform certain measurings such as pressure and temperature measurings.

The invention will be hereinafter further explained by way of example with reference to the accompanying drawing.

BRIEF DESCRIPTION OF THE DRAWING

FIG. 1a is a perspective, longitudinally sectional view of the filtering element of the present invention and FIG. 1b shows a fragment of the casing of a filtering element with permanent parts provided therein for cooperation with the filtering element of FIG. 1a.

DETAILED DESCRIPTION

Figures 1A, 1B:
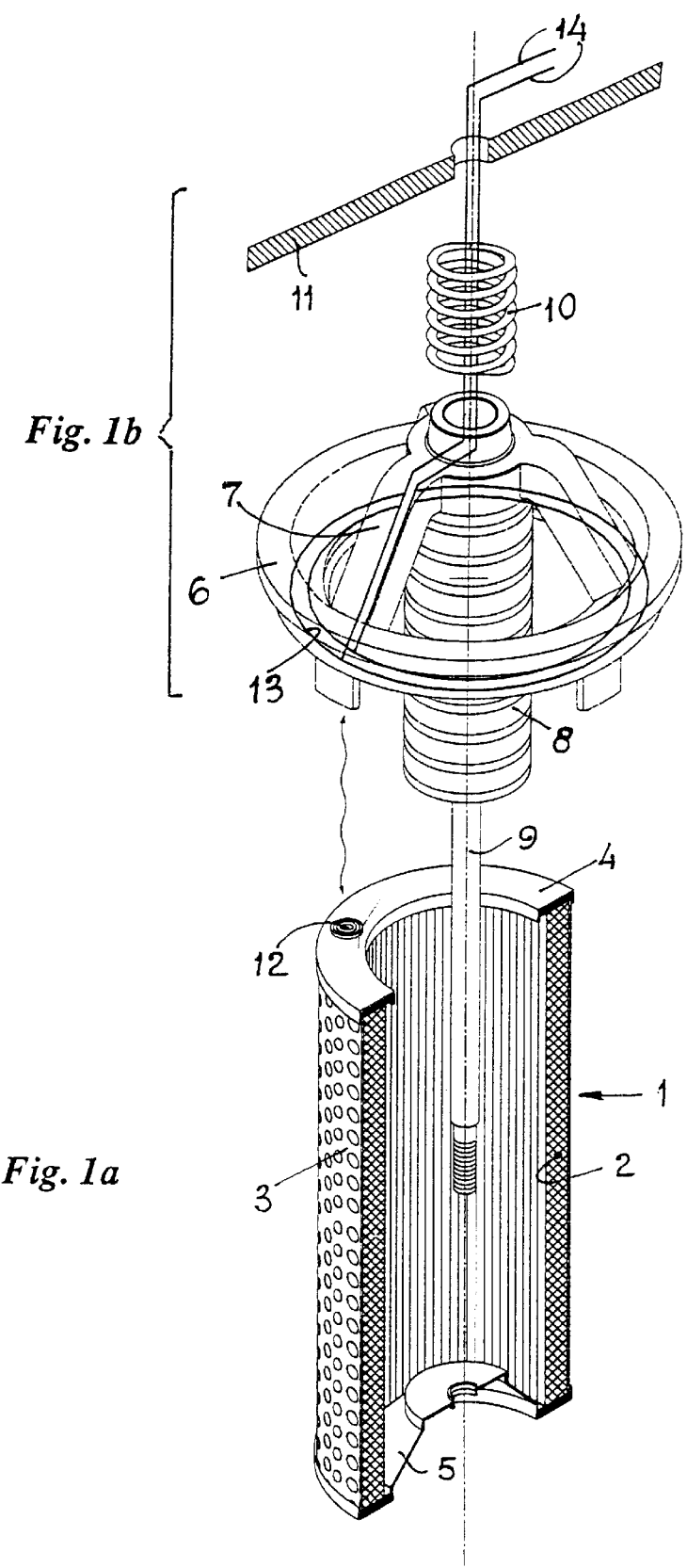

With reference to FIG. 1a the filtering element 1 shown therein in perspective and longitudinal sectional view, is composed, in a well-known manner, of an annular cylindrical filtering member 2 surrounded by a perforate support tube 3. The upper end of the filtering member 2 is received in a flat annular sealing means or end cap 4 and the lower end of it is received in the edge portion of a bottom or end cap 5.

The annular cylindrical filtering member is formed, in a well-known manner, of pleated filtering cloth, that is often formed as a laminate. The perforate support tube 3 and the end caps 4 and 5 are formed of a suitable plastic material or metal.

The thus composed filtering member constitutes the disposable component of a fluid filter, which in use has to be periodically replaced. As an example of such a filter reference is made to FIG. 2 of the International Patent Application WO 97/21480. Certain permanent parts of this well-known filter are shown in FIG. 1b of the drawings. Among these permanent parts (i.e. parts which need not to be replaced or exchanged in use) are the press ring 6 with the spider-like central piece 7 and the bushing 8 suspending therefrom with the support rod 9 as well as the press spring 10 and the cover 11.

According to the invention an identification chip 12 is provided in the flat annular sealing means or end cap 4, which chip is adapted to exchange its information with a receiver element 13 provided in the annular lower face of the press ring 6. In the example shown said receiver element 13 is in the form of a flat annular coil which is connected to a data processing device (not shown) outside the filtering device by means of connecting leads 14 which extend through a radial element of the spider 7, the press spring and the cover 11 outwardly.

In operation the filtering element 1 sealingly engages, via the sealing means or end cap 4, the lower side of the press ring 6. In the operational state the chip 12—if of the passive type—will be activated via the coil member 13 and data from the chip will be transferred via the coil element towards the data processing device.

When a spacing between the filtering element 1 and the press ring 6 is taking place, such as in case of an exchange of the filtering element or when the filtering element is elevated from its seat in case of a blocked filter, this will be observed via a corresponding interruption or weakening of the signals from the chip 12.

The example shown in the drawing relates to a filter element with which the filtering member, together with the support tube 3 and the end caps 4 and 5, forms a disposable unit.

However, the invention is also applicable with a filter element of the type, of which the perforate support tube and the end caps may be reused. A filter element of the latter type is shown in FIG. 1 of the above mentioned International Patent Application. In that particular case the identification chip is simply embedded in one of the sealing rings, in which the axial ends of the annular cylindrical filtering member are emdedded.

By forming the receiver element as a flat annular coil member the invention can also be successfully used with a filter of the so-called "spin-on" type with which the filtering element is screwed into the casing of the filter.

What is claimed is:

1. A filtering device comprising:
   a substantially cylindrical filtering element to function as a liquid permeable partition;
   an information-containing micro circuit provided in said filtering element, adapted to function as an identification label and to that end cooperating with a receiver means so as to provide for a periodic or continuous exchange of information between the micro circuit and the receiver means,
   wherein said micro circuit is embedded, at a circumferential location, in an annular sealing means which is applied to the terminal edge of an open end of the substantially cylindrical filtering element to provide sealing engagement between the filtering element and a corresponding seat and wherein said receiver means is provided in said seat and comprises a flat annular coil, the average diameter of which corresponds with that of said annular sealing means.

2. A filtering device according to claim 1, wherein said micro circuit is of the passive type and adapted to cooperate as a transponder with the receiver means.

3. A filtering device according to claim 1, wherein said micro circuit is provided with an independent power source.

4. A filtering device comprising:
   a casing;
   a filtering element; and
   an electronic means to provide for an exchange of information between the filtering element and the casing, the electronic means including a receiver of the casing, the receiver having an annular form, and the electronic means being configured such that the electronic means is always in an operative position during operation of the filtering device.

5. The filtering device of claim 4, wherein the electronic means further includes an identification chip of the filtering element.

6. The filtering device of claim 5, the filtering element including an annular seal, an upper end of the filtering element receivable in the annular seal.

7. The filtering device of claim 6, the identification chip being a part of the annular seal.

8. The filtering device of claim 5, the identification chip containing information unique to the filtering element.

9. The filtering device of claim 8, the identification chip containing information related to the type of filtering element, and the time the filtering element was installed.

10. The filtering device of claim 4, the receiver being a flat annular coil.

11. The filtering device of claim 4, the filtering element being disposable.

12. A filtering device comprising:
    a casing with a receiver, the receiver having an annular form; and
    a filtering element with an identification chip;
    wherein the identification chip and the receiver provide for an exchange of information; and
    wherein the identification chip and the receiver are so orientated such that the identification chip is always in an operative position relative the receiver during operation of the filtering device.

13. The filtering device of claim 12, the receiver being a flat annular coil.

14. The filtering device of claim 12, the filtering element including an annular seal and a filtering member, an upper end of the filtering member receivable in the annular seal; wherein the identification chip is eccentrical to a longitudinal axis of the filtering member.

15. The filtering device of claim 14, wherein the receiver has a diameter corresponding to the annular seal of the filtering element.

16. The filtering device of claim 14, wherein the identification chip is an information containing micro circuit, the micro circuit being of the passive type and adapted to cooperate as a transponder with the receiver.

17. The filtering device of claim 14, wherein the identification chip is an information containing micro circuit, the micro circuit being of the active type.

18. The filtering device of claim 14, wherein the filtering member is an annular substantially cylindrical filtering member surrounded by a perforate support tube.

19. The filtering device of claim 14, wherein the identification chip is a part of the annular seal.

20. The filtering device of claim 12, the identification chip containing information unique to the filtering member.

* * * * *